(12) United States Patent
Brussieux et al.

(10) Patent No.: US 9,540,237 B2
(45) Date of Patent: Jan. 10, 2017

(54) GAS GENERATOR WITH BUOYANT CATALYST CARRIER

(71) Applicants: Intelligent Energy Limited, Loughborough, Leicestershire (GB); The Commissariat a l'Energie Atomique et aux Energies Alternatives, Gif-sur-Yvette (FR)

(72) Inventors: Charles Brussieux, Grenoble (FR); Jerome Delmas, Merignac (FR); Isabelle Rougeaux, Rives (FR); Phillipe Capron, Virieu sur Bourbre (FR); Hung T. Than, Rockville, MD (US)

(73) Assignees: Intelligent Energy Limited, Leicestershire (GB); The Commissariat a L'energie Atomique et Aux Energies Alernatives (CEA), Gif-sur-Yvette (FR)

( * ) Notice: Subject to any disclaimer, the term of this patent is extended or adjusted under 35 U.S.C. 154(b) by 0 days.

(21) Appl. No.: 14/576,360

(22) Filed: Dec. 19, 2014

(65) Prior Publication Data
US 2016/0176709 A1    Jun. 23, 2016

(51) Int. Cl.
C01B 3/02    (2006.01)
C01B 3/06    (2006.01)

(52) U.S. Cl.
CPC ...... *C01B 3/02* (2013.01); *C01B 3/065* (2013.01)

(58) Field of Classification Search
CPC .............. C01B 3/02; C01B 3/04; C01B 3/323
See application file for complete search history.

(56) References Cited

U.S. PATENT DOCUMENTS

| 150,995 | A | * | 5/1874 | Zwietusch | 422/111 |
| 3,561,926 | A | * | 2/1971 | McElroy | B01J 7/02 |
| | | | | | 422/212 |
| 5,078,798 | A | | 1/1992 | Nicolson et al. | |

(Continued)

FOREIGN PATENT DOCUMENTS

EP    2695855 A1    2/2014

OTHER PUBLICATIONS

International Search Report and Written Opinion issued in connection with the corresponding International Application No. PCT/US2015/066279 on Feb. 26, 2016.

(Continued)

*Primary Examiner* — Stanley Silverman
*Assistant Examiner* — Syed Iqbal
(74) *Attorney, Agent, or Firm* — The H.T. Than Law Group

(57) ABSTRACT

Disclosed herein is a gas generator that contains a liquid reactant that reacts to produce a gas in the presence of a catalyst. The catalyst is contained in a carrier that is buoyant in the liquid reactant. The gas generator also has at least one carrier movement restraining member adapted to selectively control the location of the carrier, and at least one compressible body containing a volume of gas. In a first configuration, when an internal pressure of the gas generator is lower than an internal pressure of the compressible body, the compressible body increases in volume, and in a second configuration when the internal pressure of the gas generator is higher than the internal pressure of the compressible body, the compressible body decreases in volume. The carrier movement restraining member restricts the carrier's movement in the first configuration.

17 Claims, 4 Drawing Sheets

(56) References Cited

U.S. PATENT DOCUMENTS

| | | |
|---|---|---|
| 6,506,360 B1 | 1/2003 | Andersen |
| 2004/0052722 A1 | 3/2004 | Jorgensen et al. |
| 2006/0185242 A1 | 8/2006 | Cha et al. |

OTHER PUBLICATIONS

Boy Scouts of America Merit Badge Series: Chemistry; 2008; pp. 70-71.

* cited by examiner

GAS GENERATOR WITH BUOYANT CATALYST CARRIER

FIELD OF THE INVENTION

This invention generally relates to a gas generator and more particularly to a hydrogen generator with a catalyst carrier that is suspended within the generator. The gas generator is passively controlled, i.e., it automatically stops generating gas when the internal pressure reaches a certain level, and vice versa.

BACKGROUND OF THE INVENTION

Fuel cells are devices that directly convert chemical energy of reactants, i.e., fuel and oxidant, into direct current (DC) electricity. For an increasing number of applications, fuel cells are more efficient than conventional power generation, such as the combustion of fossil fuels, as well as portable power storage, such as lithium-ion batteries. In particular, one use of fuel cells is as a mobile power source for portable or mobile consumer electronic devices, such as cell phones, smart phones, personal digital assistants, personal gaming devices, global positioning devices, rechargeable batteries, computer tablets, laptop computers, etc.

Known fuel cells include alkali fuel cells, polymer electrolyte fuel cells, phosphoric acid fuel cells, molten carbonate fuel cells, solid oxide fuel cells, and enzyme fuel cells. Fuel cells generally run on hydrogen ($H_2$) fuel, and they can also consume non pure hydrogen fuel. Non pure hydrogen fuel cells include direct oxidation fuel cells, such as direct methanol fuel cells (DMFC), which use methanol, or solid oxide fuel cells (SOFC), which use hydrocarbon at high temperature. Hydrogen fuel can be stored in compressed form or within compounds, such as alcohols or hydrocarbons or other hydrogen containing materials, that can be reformed or converted into hydrogen fuel and byproducts. Hydrogen can also be stored in chemical hydrides, such as sodium borohydride ($NaBH_4$), that react with water or an alcohol to produce hydrogen and byproducts. Hydrogen can also be adsorbed or absorbed in metal hydrides, such as lanthanum pentanickel ($LaNi_5$), at a first pressure and temperature and released to a fuel cell at a second pressure and temperature. Hydrogen can also be released via thermolysis reaction of a metal hydride, such as magnesium hydride ($MgH_2$).

Most low temperature hydrogen fuel cells have a proton exchange membrane, or polymer electrolyte membrane (PEM), which allows the hydrogen's protons to pass through, but forces the electrons to pass through an external circuit, which advantageously can be a smart phone, a personal digital assistant (PDA), a computer, a power tool, or any device that uses electron flow or electrical current. The fuel cell reaction can be represented as follows:

Half-reaction at the anode of the fuel cell:

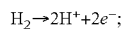

$$H_2 \rightarrow 2H^+ + 2e^-;$$

Half-reaction at the cathode of the fuel cell:

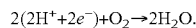

$$2(2H^+ + 2e^-) + O_2 \rightarrow 2H_2O.$$

Generally, the PEM is made from a proton exchange polymer that acts as the electrolyte, such as Nafion® available from DuPont, which is a perfluorinated sulfonic acid polymer, or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

The patent and scientific literatures disclose few gas or hydrogen gas generation systems that automatically separate the catalyst from the reactants when a predetermined pressure is reached. However, there remains a need for additional designs.

SUMMARY OF THE INVENTION

The invention is directed to a gas generation system that automatically separates the catalyst system from the reactants when a predetermined pressure is reached and automatically brings the catalyst system into chemical contact with the reactants when the pressure drops below the predetermined pressure.

The present invention relates to a gas generation apparatus comprising:

a housing containing a liquid reactant that reacts to produce a gas in the presence of a catalyst, wherein the catalyst is contained in a carrier disposed within the housing and wherein the carrier has an overall density lower than that of the liquid reactant, at least one carrier movement restraining member adapted to selectively control the location of the carrier, and at least one compressible body containing a volume of gas, wherein, in a first configuration, an internal pressure of the gas generator is lower than an internal pressure of the compressible body and the compressible body increases in volume and, in a second configuration, the internal pressure of the gas generator is higher than the internal pressure of the compressible body and the compressible body decreases in volume, and wherein the at least one carrier restraining member restricts the carrier's movement in the first configuration.

The carrier movement restraining member may comprise at least one porous containment member that allows the liquid reactant to flow therethrough and at least partially encloses the carrier. In the first configuration, the at least one porous containment member prevents the carrier from floating on top of the liquid reactant. In some embodiments, the at least one carrier restraining member can be affixed relative to the housing of the gas generator.

Alternatively, the carrier movement restraining member may comprise at least one flexible string or strip connected at one end to the carrier and to the housing of the gas generator at the other end.

Alternatively, the carrier movement restraining member may comprise at least one substantially nonflexible rod connected at one end to the carrier and pivotally to the housing of the generator at the other end.

In some embodiments, the at least one porous containment member is movable relative to the housing of the gas generator. In one example, the at least one porous containment member may be connected to the compressible body. In the first configuration, the at least one porous containment member moves to immerse the carrier in the liquid reactant.

The catalyst carrier may comprise at least one buoyant member and/or at least one ballast.

The present invention also relates to a method of operating a gas generator comprising the steps of:

providing a housing containing a liquid reactant and a catalyst carrier, wherein the catalyst carrier is more buoyant than the liquid reactant;

providing within the housing a compressible body containing a volume of gas, wherein, in a first configuration, an internal pressure of the gas generator is lower than an internal pressure of the compressible body so the compressible body increases in volume, and, in a second configuration, the internal pressure of the gas generator is higher than the internal pressure of the compressible body so the compressible body decreases in volume; and restricting movement of the catalyst carrier in the first configuration.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF THE PREFERRED EMBODIMENTS

The present invention is directed to a gas generator with a catalyst carrier that has restricted movements within the gas generator. Preferably, the catalyst carrier comprises a catalyst float that has an overall density that is lower than that of the liquid reactant(s) within the gas generator to provide the catalyst sufficient buoyancy to float on top of the liquid reactant(s), thereby lifting or otherwise separating the catalyst from the liquid reactant(s) to stop the reaction by the reactants to produce a gas. The catalyst carrier, or float, in some embodiments is unattached to the gas generator and is contained within a cage or an open/porous containment system that allows the liquid reactant(s) to flow there through and that allows the generated gas to exit. In other embodiments, the catalyst carrier is attached to the housing of the gas generator via a flexible attachment means, such as a string or a strip. During operation, in one embodiment the containment system remains substantially stationary relative to a housing of the gas generator. The gas generator further comprises at least one expanding or compressible member. The volume of this expanding member depends on the internal pressure of the gas generator. In this embodiment, when the internal pressure is low the volume of the expanding member increases to raise the level of the liquid reactants to substantially cover the catalyst float, whose movement is restricted by the open containment system, in order to allow the liquid reactants to reach the catalyst in the catalyst float. When the internal pressure is high, the volume of the expanding member decreases to lower the level of the liquid reactants, and the catalyst float floats to the top of the liquid reactants without restriction by the open containment system, which lifts the catalyst above the level of the liquid reactants. In another embodiment, the porous containment system comprises at least one movable porous member that moves in response to the internal pressure of the gas generator to move the catalyst carrier to be immersed in the liquid reactant(s).

The catalyst float may have buoyancy member(s) and/or ballast(s) to control its buoyancy or overall density, and the float may have ingress channel(s) to allow the liquid reactant to enter the float and egress channel(s) for the produced gas to exit through. Preferably, the catalyst within the catalyst float is located away from the inlet end of the ingress channel(s) and toward the center of the float, so that the catalyst is spaced apart from the surface of the liquid reactants when the catalyst float floats on top of the liquid reactant. The present inventive gas generator may have one or more preferred specific orientations, or range of orientations, to operate, or it can operate independent of the orientation of the gas generator.

Figure 1:
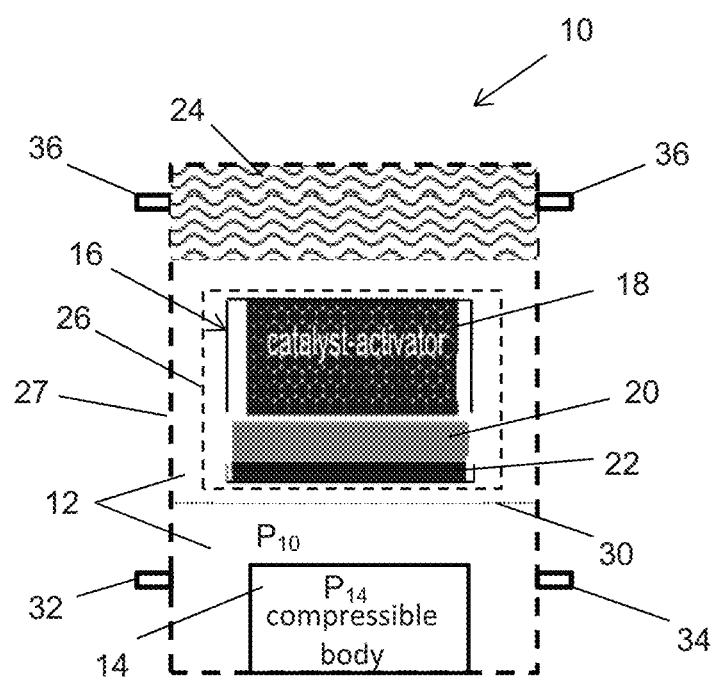
FIG. 1 is a schematic drawing of the inventive gas generator.

Referring to FIG. 1, gas generator 10 contains a liquid reactant that may comprise a mixture 12 of sodium borohydride or potassium borohydride, water, and a preservative, such as sodium hydroxide or potassium hydroxide. This mixture reacts in the presence of a catalyst to produce hydrogen. The present invention is not limited to any particular fuel mixtures that react to produce hydrogen. Other suitable fuels are described in U.S. Pat. Nos. 8,636,961 and 8,636,826. Furthermore, other fuel mixtures can be used with gas generator 10 to produce other gases, such as oxygen carbonic acid gas, etc. Non-limiting examples of a non-hydrogen gas generator are disclosed in U.S. Pat. Nos. 8,142,726 and 150,995, which are incorporated herein by reference in their entireties. The top level of the liquid reactant 12 is controlled by the internal pressure of gas generator 10 and the internal pressure of a compressible body 14, which preferably contains a fixed volume of gas. When the internal pressure ($P_{10}$) within gas generator 10 is higher than the internal pressure ($P_{14}$) of compressible body 14, first this relative pressure ($P_{10}>P_{14}$) compresses the compressible body 14 to lower the liquid level. On the other hand, when the internal pressure ($P_{10}$) within gas generator 10 is lower than the internal pressure ($P_{14}$) of compressible body 14, this second relative pressure ($P_{14}>P_{10}$) allows the compressible body 14 to expand to raise the liquid level. Hence, $P_{14}$ can be thought of as a reference pressure, which may have any value including the value of atmospheric pressure. The volume of compressible body 14 determines the amount of level rise experienced by liquid reactant 12.

Gas generator 10 further comprises a catalyst carrier/system or a catalyst float 16, which contains catalyst 18, optional buoyant member 20 and optional ballast 22. Liquid reactant 12 reacts in the presence of catalyst 18 to produce gas, preferably hydrogen 24. Buoyant member 20 and/or ballast 22 are used to tune the density of catalyst float 16 so that float 16 preferably would float on top of the surface of liquid reactant 12, if the movements of catalyst float 16 is unconstrained. As illustrated in FIG. 1, the movement of catalyst float 16 is limited to within a boundary, such may be a provided by a carrier movement restraining members, such as, for example, a porous enclosure 26, e.g., a cage or a screen enclosure, etc. Preferably, porous enclosure 26 is relatively fixed to housing 27 of gas generator 10. For example, porous enclosure 26 may be attached directly or indirectly to housing 27.

In operation, liquid reactant 12 reacts in the presence of catalyst 18 to produce gas 24. If gas 24 remains within gas generator 10, or if gas 24 is withdrawn at a rate that is less than the rate of gas generation, then the internal pressure $P_{10}$ of gas generator 10 would increase. When $P_{10}$ is greater than the internal pressure $P_{14}$ of compressible body 14, the first pressure differential $(P_{10}-P_{14})$ compresses body 14 and, thereby, lowers the level of liquid reactant 12. When the liquid level drops below porous enclosure 26, e.g., at level 30 shown in FIG. 1, liquid reactant 12 no longer contacts catalyst 18, and the reaction that produces gas 24 stops. On the other hand, if gas 24 exits gas generator 10 and is consumed by a device, such as a fuel cell(s), $P_{10}$ decreases and when $P_{10}$ is lower than $P_{14}$, this second pressure differential $(P_{14}-P_{10})$ allows compressible body 14 to expand to raise the liquid level of liquid reactant 12 until the liquid level rises above porous enclosure 26, thereby allowing liquid reactant 12 access into catalyst float 16 and to catalyst 18. It is noted that since catalyst float 16 floats on top of liquid reactant 12, reaction should not occur until after catalyst float 16's motion is arrested by the top of porous enclosure 26.

Gas generator 10 may also have liquid reactant inlet 32 and liquid reactant outlet 34 to replace spent liquid reactant 12 with fresh supplies, and gas outlet 36 to remove the produce gas from the gas generator. Additionally, gas generator 10 may have a gas separator or a gas separator composite, such as those described and claimed in U.S. Pat. No. 8,636,826 and US 2011/0212374 to separate and remove the produced gas from liquid reactant 12 and byproducts.

Figures 2A, 2B:
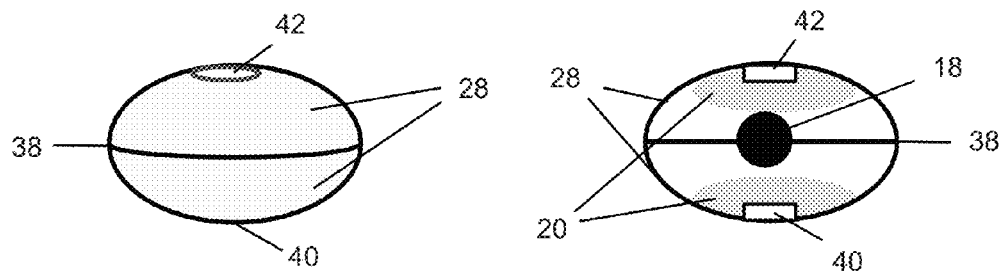
FIG. 2A is a perspective view of one embodiment of the inventive catalyst float.
FIG. 2B is a cross-sectional view of the catalyst float of FIG. 2A.

FIGS. 2A and 2B illustrate one embodiment of catalyst float 16, which has two half-shells that form housing 28 of the float 16. The two half-shells are joined at centerline 38. Catalyst 18 is preferably stored proximate to the center of catalyst float 16. Buoyant member 20 is provided to ensure that catalyst float 16 floats on top of the surface of liquid reactant 12. Ballast 22 (shown in FIG. 1) can also be added. Catalyst float 16 has at least one inlet 40 and one outlet 42. Typically, in the orientation shown in FIGS. 2A and 2B, liquid reactant 12 enters catalyst float 16 at inlet 40 and the gas produced exits catalyst float 16 at outlet 42. Since this embodiment of catalyst float 16 is symmetrical, it remains operational when turned upside down and the inlet becomes the outlet, and vice versa. It is also preferred that catalyst 18 is spaced apart from the outer edge of inlet/outlet 40, 42, so that when catalyst float 16 sits on top of liquid reactant 12 catalyst 18 is not in contact with liquid reactant 12. Porous enclosure 26 may be provided to enclose the catalyst float 16 and forces catalyst float 16 to immerse into liquid reactant 12, as the level of liquid reactant 12 rises when compressible body 14 expands when $(P_{14}>P_{10})$.

Figures 3A, 3B, 3C:
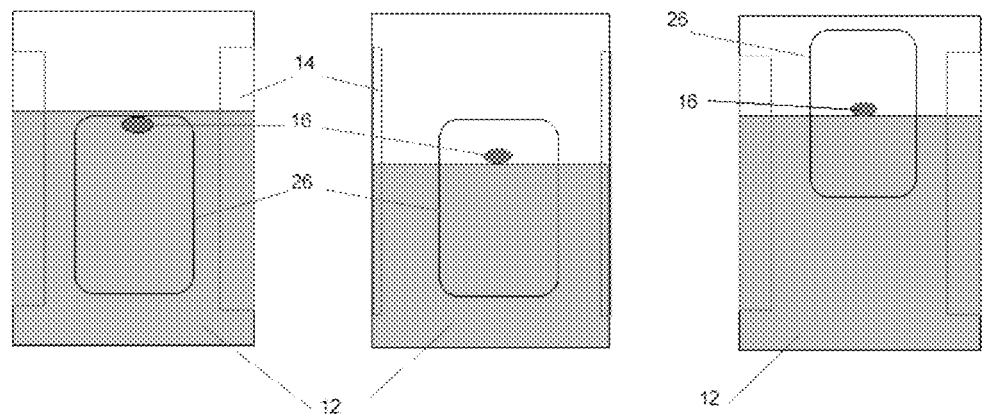
FIGS. 3A-3C are cross-sectional views of another embodiment of the inventive gas generator in various configurations.

FIG. 3A shows another embodiment of gas generator 10 in operation and producing gas. Catalyst float 16 is immersed within liquid reactants 12 and compressible body 14 is inflated. Porous enclosure 26 keeps catalyst float 16 immersed in liquid reactant 12. Porous enclosure 26 in this embodiment at least partially encloses catalyst float 16, although it may also fully enclose the catalyst float 16. FIG. 3B shows gas generator 10 in operation but with compressible body 14 deflated, and the surface level of liquid reactant 12 has fallen below the top of porous enclosure 26 sufficiently for catalyst float 16 to float on top of liquid reactant 12, thereby lifting catalyst 18 away from liquid reactant 12. It is noted that, as shown in FIGS. 3A and 3B, while gas generator is in operation, porous enclosure 26 is fixed relative to housing 28 of gas generator 10.

FIG. 3C illustrates one possible way to keep catalyst float 16 away from liquid reactant 12 during storage and before first use by moving porous enclosure 26 upward relative to housing 28 so that catalyst float 16 always remains above liquid reactant 12. Another way of storing gas generator before the first use, or the first sale, is to keep separate and unmixed the two or more components of liquid reactant 12, e.g., keep the water unmixed with the sodium borohydride until just before the first use.

As shown in FIGS. 1 and 3A and 3B, gas generator 10 operates in the orientation shown. However, gas generator 10 can be made operational in any orientation if shapes of the housing 27 and the porous enclosure 26 are substantially similar and with porous enclosure 26 placed within housing 28 so their geometric centers coincide with each other. For example, housing 27 and porous enclosure 26 may have spherical shapes with their centers located at substantially the same point. The distance between porous enclosure 26 and housing 27 would substantially be the same in this case. In another example, housing 27 and porous enclosure 26 have a cubic shape with their geometrical centers coinciding with each other. The distance between cubic porous enclosure 26 and cubic housing 28 is substantially the same except at the corners.

Figures 4A, 4B:
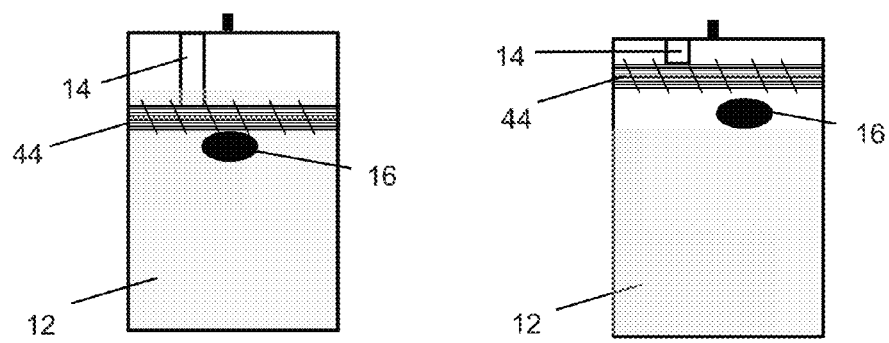
FIGS. 4A-4B are cross-sectional views of another embodiment of the inventive gas generator.

In another embodiment, porous enclosure 26 is simplified to be a porous piston 44 attached to compressible body 14, as shown in FIGS. 4A and 4B. As $(P_{14}>P_{10})$, compressible body 14 expands and pushes porous piston 44 and catalyst float 16 into liquid reactant 12. As $(P_{14}<P_{10})$, compressible body contracts to lift porous piston away from liquid reactant 12 to allow catalyst float 16 to float on top and arrest the reaction. It is noted that in this case, the expansion and contraction of compressible body 14 does not raise the liquid reactant level significantly or sufficiently to move liquid reactant 12 into catalyst float 16. The expansion/contraction of compressible body 14 directly moves the catalyst float 16 into and out of liquid reactant 12 by pushing the catalyst float 16 into the liquid reactant 12 when in the expanded state (FIG. 4A) and by allowing the catalyst float 16 to emerge from the liquid reactant 12 when in the contracted state (FIG. 4B).

Figures 5A, 5B:
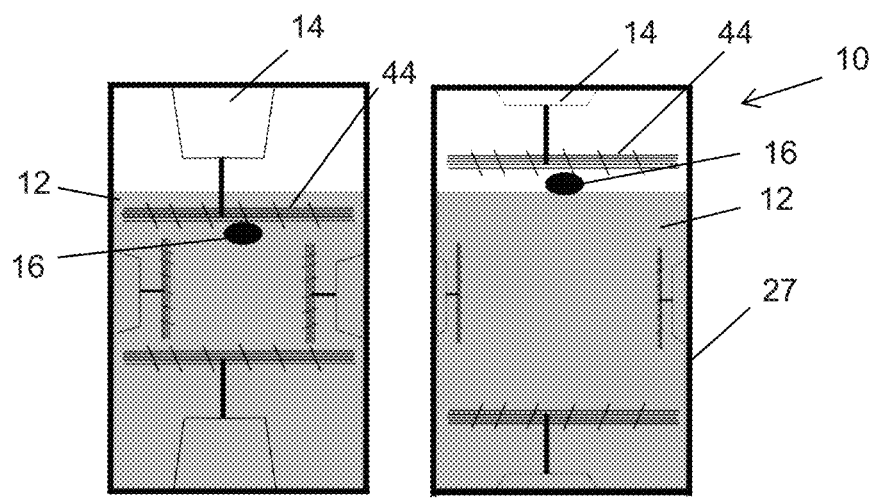
FIGS. 5A-5B are cross-sectional views of another embodiment of the inventive gas generator.

FIGS. 5A-5B show a variation of the embodiment of FIGS. 4A and 4B. This variation shows a plurality, e.g., four sets of compressible body 14/porous screen 44 mounted on the walls of housing 27. This variation allows gas generator 10 to operate in multiple orientations, e.g., each set 14/44 provides at least one operable orientation.

Figure 6A:
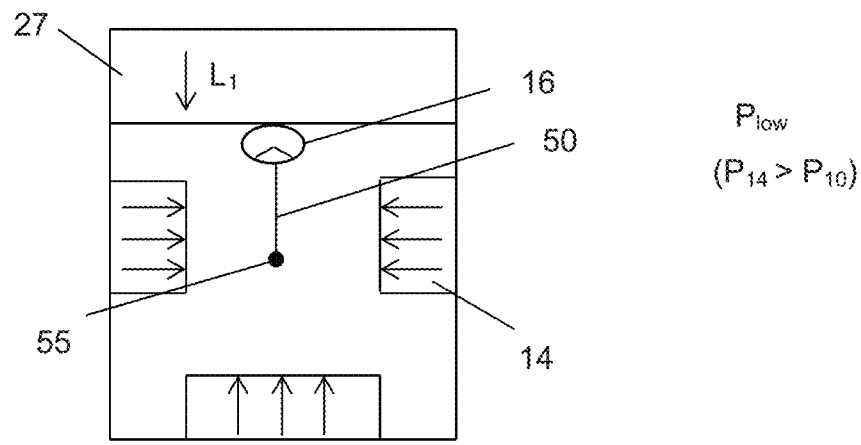
FIGS. 6A-6B are cross-sectional views of another embodiment of the inventive gas generator.
Figure 6B:
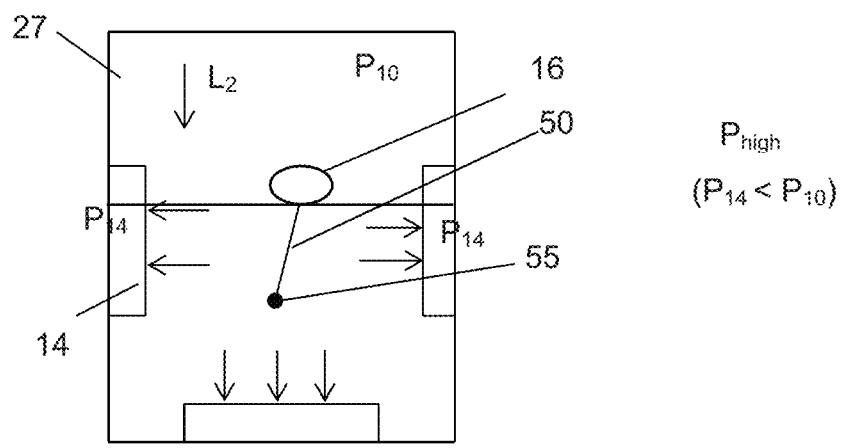

In accordance with the present invention, as shown in FIGS. 6A and 6B, the movement of the catalyst float 16 may be limited by at least one carrier movement restraining member that includes a flexible member such as a string or a strip 50 connected, on one end, to the catalyst float 16 and, on another end, to an anchoring point 55 located on the floor and/or on the top and/or on a sidewall of the housing 27. In this embodiment, the porous enclosure 26 is optional, and may be replaced completely by string/strip 50 or used in conjunction with string/strip 50. As evident from FIG. 6A, when $P_{14}>P_{10}$, one or more compressible bodies 14 in the liquid reactant 12 expand to an expanded state and, as a result, the level of liquid reactant in the housing 27 rises to level $L_1$. As evident from FIG. 6B, when $P_{14}<P_{10}$, the one or more compressible bodies 14 in the liquid reactant 12 contract to a contracted state and, as a result, the level of liquid reactant in housing 27 falls to level $L_2$, which is lower than level $L_1$. String/strip 50 is FIG. 6B may be slacked and not taught/tight. As evident from FIGS. 6A and 6B, level $L_1$ is higher than level $L_2$.

Alternatively, member 50 can be a substantially nonflexible rod or link 50 that is connected at one end to catalyst float 16 and pivotally connected at end 55 to housing 27, such that as the reactant level drops to level $L_2$ as shown in FIG. 6B, rod 50 can pivot to maintain catalyst float 16 on top of the surface of the reactant.

While it is apparent that the illustrative embodiments of the invention disclosed herein fulfill the objectives stated above, it is appreciated that numerous modifications and other embodiments may be devised by those skilled in the art. Features from one embodiment can be used with other embodiments. Therefore, it will be understood that the appended claims are intended to cover all such modifications and embodiments, which would come within the spirit and scope of the present invention.

We claim:

1. A gas generation apparatus comprising:
    a housing containing a liquid reactant that reacts to produce a gas in the presence of a catalyst, wherein the catalyst is contained in a carrier disposed within the housing and wherein the carrier has an overall density lower than that of the liquid reactant,
    at least one carrier movement restraining member adapted to selectively control the location of the carrier, and
    at least one compressible body containing a volume of gas,
    wherein, in a first configuration, an internal pressure of the gas generator is lower than an internal pressure of the compressible body and the compressible body increases in volume and, in a second configuration, the internal pressure of the gas generator is higher than the internal pressure of the compressible body and the compressible body decreases in volume,
    wherein the at least one carrier restraining member restricts the carrier's movement in the first configuration,
    wherein, in the first configuration, the at least one carrier movement restraining member prevents the carrier from floating on top of the liquid reactant,
    wherein the at least one carrier restraining member is fixed relative to the housing of the gas generator,
    wherein, in the first configuration, the compressible body increases in volume to raise a level of the liquid reactant within the housing, and wherein, in the second configuration, the compressible body decreases in volume to lower the level of the liquid reactant within the housing, and
    wherein the compressible body is at least partially submerged in the liquid reactant.

2. A gas generation apparatus comprising:
    a housing containing a liquid reactant that reacts to produce a gas in the presence of a catalyst, wherein the catalyst is contained in a carrier disposed within the housing and wherein the carrier has an overall density lower than that of the liquid reactant,
    at least one carrier movement restraining member adapted to selectively control the location of the carrier, and
    at least one compressible body containing a volume of gas,
    wherein, in a first configuration, an internal pressure of the gas generator is lower than an internal pressure of the compressible body and the compressible body increases in volume and, in a second configuration, the internal pressure of the gas generator is higher than the internal pressure of the compressible body and the compressible body decreases in volume,
    wherein the at least one carrier restraining member restricts the carrier's movement in the first configuration,
    wherein the at least one carrier movement restraining member comprises at least one porous containment member that allows the liquid reactant to flow therethrough and that at least partially encloses the carrier,
    wherein, in the first configuration, the at least one porous containment member prevents the carrier from floating on top of the liquid reactant,
    wherein the at least one porous containment member is movable relative to the housing of the gas generator, and
    wherein the at least one porous containment member is connected to the compressible body.

3. The gas generator of claim 2, wherein, in the first configuration, the at least one porous containment member moves to immerse the carrier in the liquid reactant.

4. The gas generator of claim 1, wherein the catalyst is disposed proximate to a center of the carrier.

5. The gas generator of claim 1, wherein the catalyst is symmetrical about at least one plane.

6. The gas generator of claim 1, wherein the carrier further comprises at least one buoyant member.

7. The gas generator of claim 6, wherein the carrier further comprises at least one ballast.

8. The gas generator of claim 1, wherein the at least one carrier movement restraining member comprises at least one strip connected to the carrier and to an anchoring point located on the housing.

9. A gas generation apparatus comprising:
    a housing containing a liquid reactant that reacts to produce a gas in the presence of a catalyst, wherein the catalyst is contained in a carrier disposed within the housing and wherein the carrier has an overall density lower than that of the liquid reactant,
    at least one carrier movement restraining member adapted to selectively control the location of the carrier, and
    at least one compressible body containing a volume of gas,
    wherein, in a first configuration, an internal pressure of the gas generator is lower than an internal pressure of the compressible body and the compressible body increases in volume and, in a second configuration, the internal pressure of the gas generator is higher than the internal pressure of the compressible body and the compressible body decreases in volume, and
    wherein the at least one carrier restraining member restricts the carrier's movement in the first configuration, wherein the at least one carrier movement restraining member comprises at least one substantially non-flexible rod or link connected to the carrier at one end and pivotally connected to an anchoring point located on the housing at the other end.

10. The gas generator of claim 2, wherein the catalyst is disposed proximate to a center of the carrier.

11. The gas generator of claim 2, wherein the catalyst is symmetrical about at least one plane.

12. The gas generator of claim 2, wherein the carrier further comprises at least one buoyant member.

13. The gas generator of claim 12, wherein the carrier further comprises at least one ballast.

14. The gas generator of claim 9, wherein the catalyst is disposed proximate to a center of the carrier.

15. The gas generator of claim 9, wherein the catalyst is symmetrical about at least one plane.

16. The gas generator of claim 9, wherein the carrier further comprises at least one buoyant member.

17. The gas generator of claim 16, wherein the carrier further comprises at least one ballast.

* * * * *